United States Patent [19]

Watanabe

[11] Patent Number: 4,689,693
[45] Date of Patent: Aug. 25, 1987

[54] IMAGE READING APPARATUS

[75] Inventor: Junji Watanabe, Yokohama, Japan

[73] Assignee: Kabushiki Kaisha Toshiba, Kawasaki, Japan

[21] Appl. No.: 861,587

[22] Filed: May 9, 1986

[30] Foreign Application Priority Data

May 14, 1985 [JP] Japan .................................. 60-102130
May 20, 1985 [JP] Japan .................................. 60-107710

[51] Int. Cl.⁴ ............................................ H04N 1/04
[52] U.S. Cl. .................................... 358/285; 358/293; 358/294
[58] Field of Search ......................... 358/285, 293, 294

[56] References Cited

U.S. PATENT DOCUMENTS 4,500,197 2/1985 Dannatt ............................... 358/285
4,554,592 11/1985 Yoshida ............................... 358/293

FOREIGN PATENT DOCUMENTS 115076 9/1981 Japan .
62270 4/1985 Japan .
124174 7/1985 Japan .
141073 7/1985 Japan .

Primary Examiner—Michael A. Masinick
Attorney, Agent, or Firm—Schwartz, Jeffery, Schwaab, Mack, Blumenthal & Evans

[57] ABSTRACT

In an image reading apparatus which effects movement of an optical carriage while light from a light source on the carriage is radiated towards an original document set on an original document table and reads the document's image by causing light reflected from the document to be received by a photosensitive element, an image reading apparatus which is constituted by designating switches for designating the range of illumination by the light source that results from movement of the optical carriage with respect to an original document set on the original document table and a movement control means which, on the basis of the designation by this designating switches, controls movement of the optical carriage starting from a scanning start position and going only a distance such that light is radiated from the light source over the specified illumination range.

5 Claims, 27 Drawing Figures

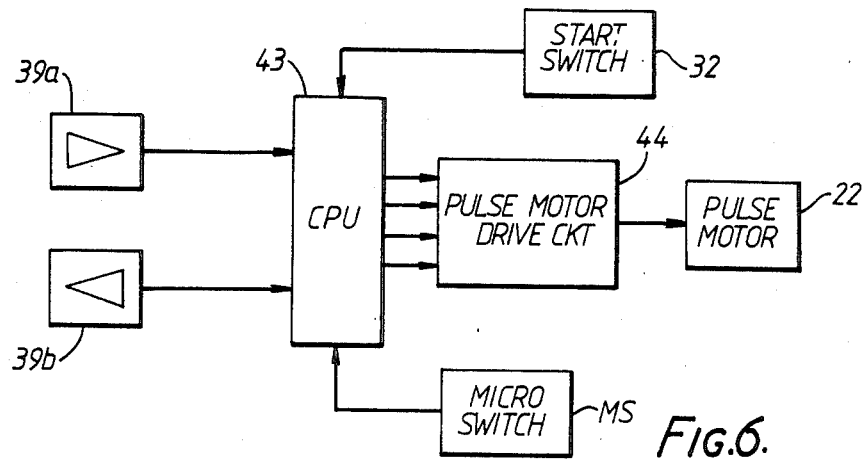
FIG.6.
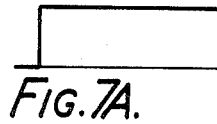
MOVING SIG. FROM SW 39a  FIG.7A.
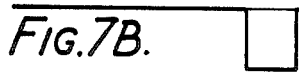
MOVING SIG. FROM SW 39b  FIG.7B.
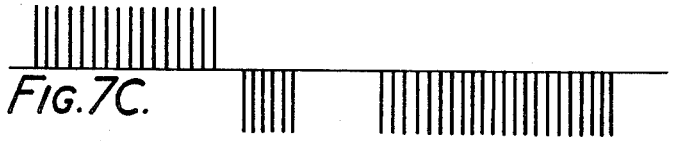
DRIVE SIG. FROM CKT 44  FIG.7C.
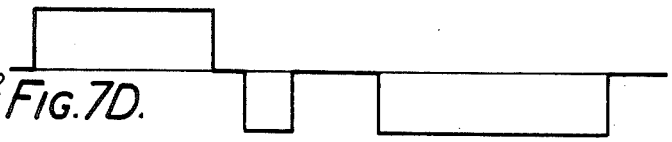
ROTATING PULSE MOTOR 22  FIG.7D.
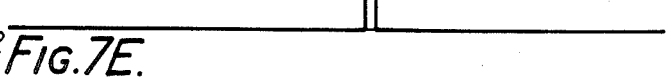
COPY START SIG. FROM SW 32  FIG.7E.
COPY STOP SIG. FROM SW MS  FIG.7F.

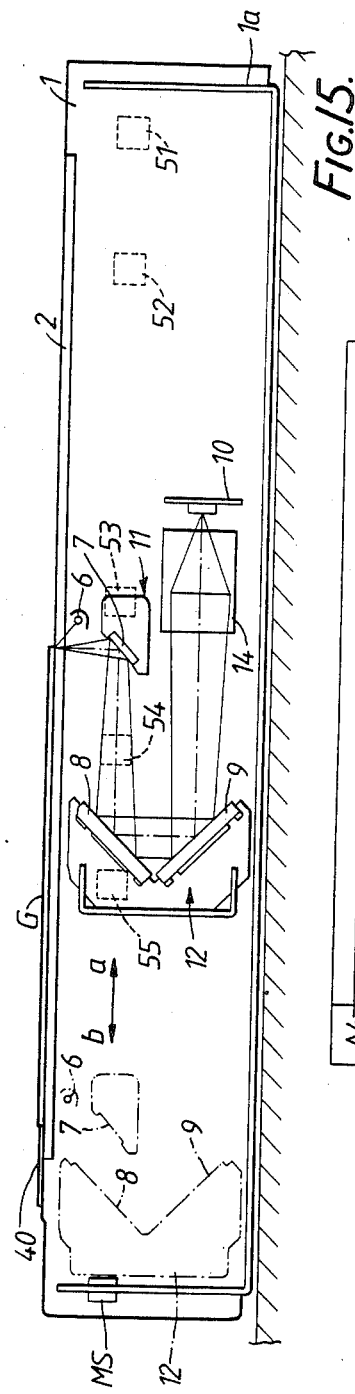
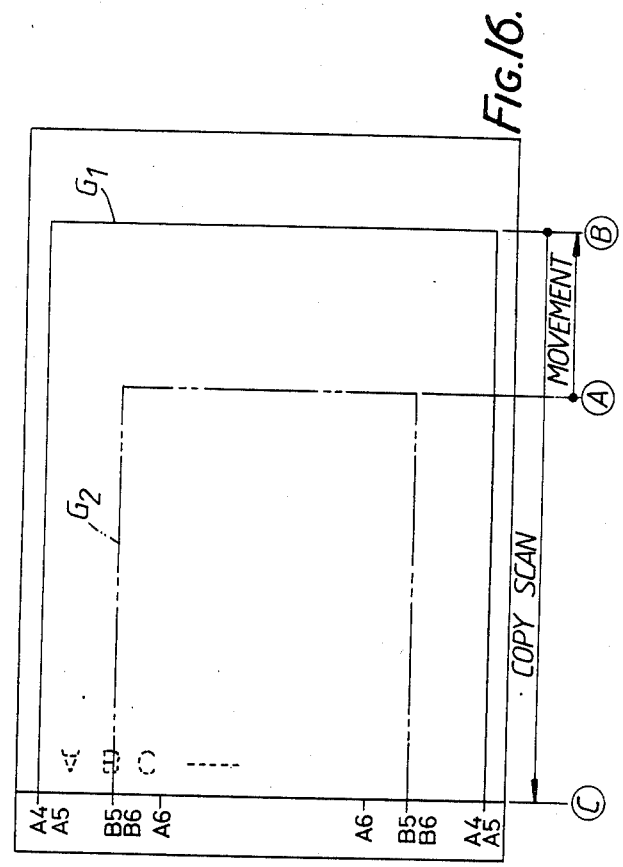

IMAGE READING APPARATUS

BACKGROUND OF THE INVENTION

1. Field of the Invention

The present invention relates to an image reading apparatus that is employable in a scanning printer, etc.

2. Discussion of Background

Generally in a scanning printer, an original document is placed on a glass plate of an original document table and is scanned while illuminated with light from a lamp and the document's image is read by light reflected from it being focussed via mirrors and a lens onto a photoelectric conversion element. Then, the image is transferred onto copy paper by causing a thermal head in a printing section to produce heat on the basis of the read image information.

It is noted that the arrangement is one in which the lamp and mirrors are mounted on a carriage and the original document is scanned by movement of the carriage.

Conventionally, scanning is effected by moving the carriage over the maximum copiable area, and so there is the drawback that there is wasteful use of copying time if the area to be copied is small, e.g., if only a partial copy is made or the original document is small. Because of this there is increased power consumption, with the drawback, particularly in apparatus in which the carriage is driven by dry batteries, etc., of greatly increased battery consumption.

OBJECT OF THE INVENTION

The object of the present invention is to provide an image reading apparatus such that it is possible to scan just a copy area.

It is a further object of the invention to provide an image reading apparatus which can effect scanning without waste in accordance with the size of an original document that is copied.

SUMMARY OF THE INVENTION

In order to achieve the above objects, according to the invention, the image reading apparatus in an image reading apparatus in which an optical carriage is moved while light from a light source provided on the carriage is radiated towards an original document placed on an original document table consists of a designation means for designating the range of illumination effected by the light source as the result of movement of the optical carriage with respect to an original document set on the original document table and a movement control means which, on the basis of the designation by this designation means, controls movement of the optical carriage starting from a scanning start position and going only a distance such that light is radiated from the light source over the specified illumination range.

BRIEF DESCRIPTION OF THE DRAWINGS

FIG. 6 is a block diagram in illustration of the electrical operation of the image reading apparatus of the present invention;

FIGS. 7A-7F are timing charts relating to explanation of the block diagram shown in FIG. 6;

FIG. 14–21 show a second embodiment of the invention;

FIG. 14 is a perspective view of a scanning printer's control section;

FIG. 15 is a front view showing how microswitches are disposed along the path of movement of an optical carriage;

FIG. 16 is a plane view showing how the optical carriage moves with respect to an original document;

FIG. 17 is a plane view of paper onto which a copy has been made;

FIG. 18 is a plane view of an original document support illustrating how the optical carriage moves with respect to original documents of the size of the original document shown in FIG. 16 and of a different size;

FIG. 19 is a plane view of paper onto which a copy of the original document shown in FIG. 18 has been made;

FIG. 20 is a plane view of the original document support illustrating how the optical carriage moves fro an original document of yet another size;

FIG. 21 is a flowchart for explaining operation; and

DETAILED DESCRIPTION OF THE PREFERRED EMBODIMENTS

A first embodiment of an image reading apparatus according to the present invention used in a scanning printer will now be described with reference to FIG. 1 through FIG. 13.

Figure 1:
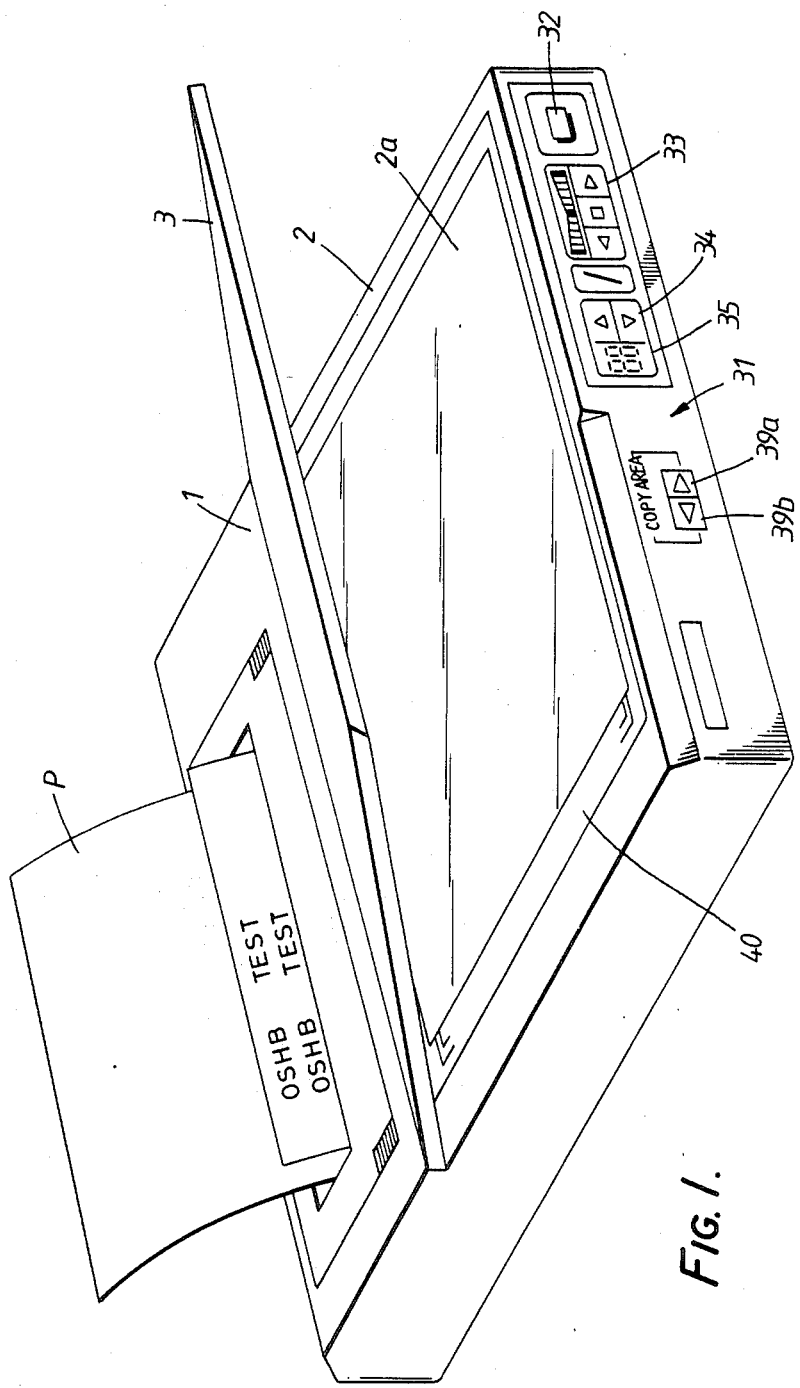
FIG. 1 is a perspective view showing a scanning printer that incorporates the image reading apparatus of the present invention.
Figure 2:
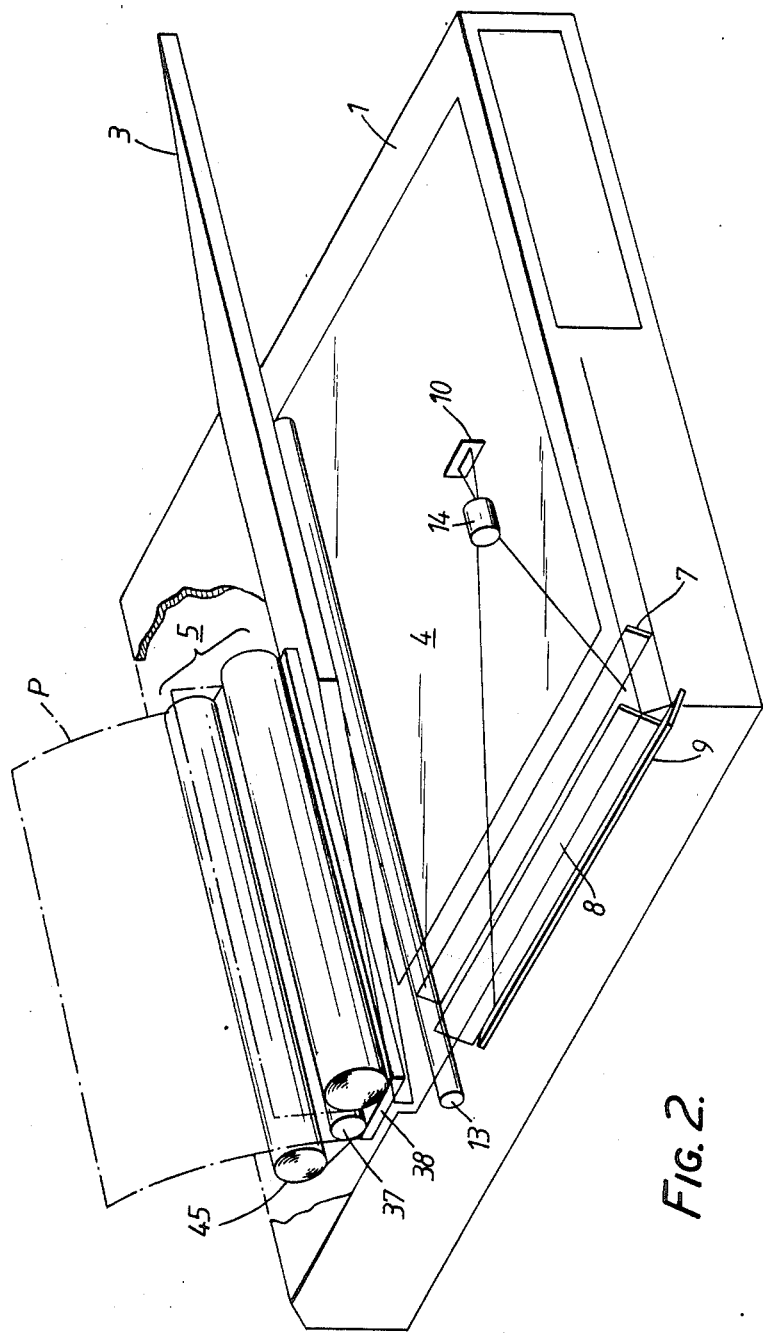
FIG. 2 is a perspective view showing the interior of the scanning printer shown in FIG. 1.

FIG. 1 shows a scanning Printer incorporating an image reading apparatus according to the present invention. An original document table 2 is provided on the upper surface of a main body 1 and is fitted with a glass plate 2a which can be covered or uncovered by an original document cover 3. At one side of glass plate 2a of original document table 2, there is a scale 40 that constitutes a first indicator for positioning one edge of an original document G. As shown in FIG. 2, a scanning section 4 is provided below glass plate 2a and a printing section 5 is provided to the rear of scanning section 4.

Figure 3:
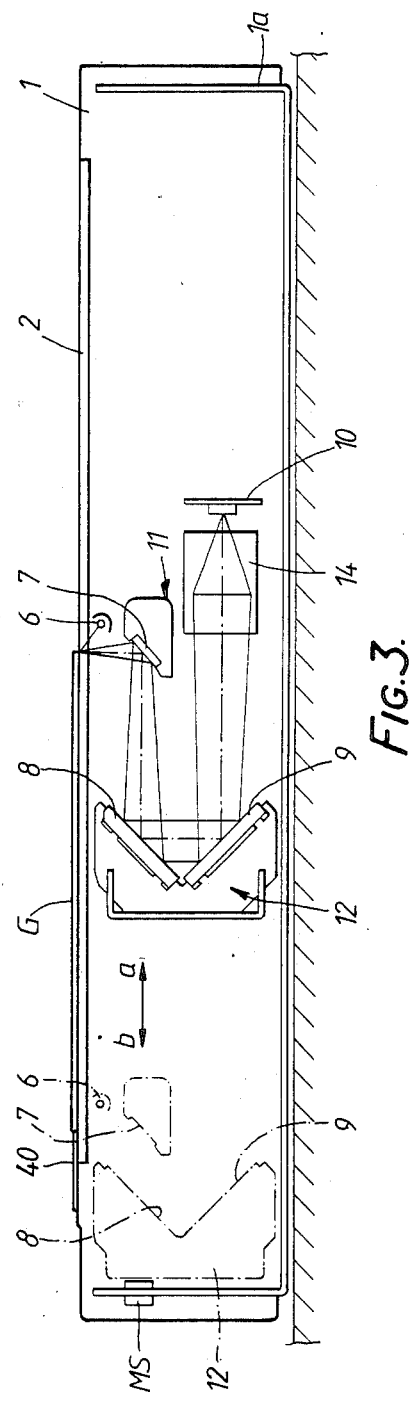
FIG. 3 is a front view of the image reading apparatus of the present invention.
Figure 4:
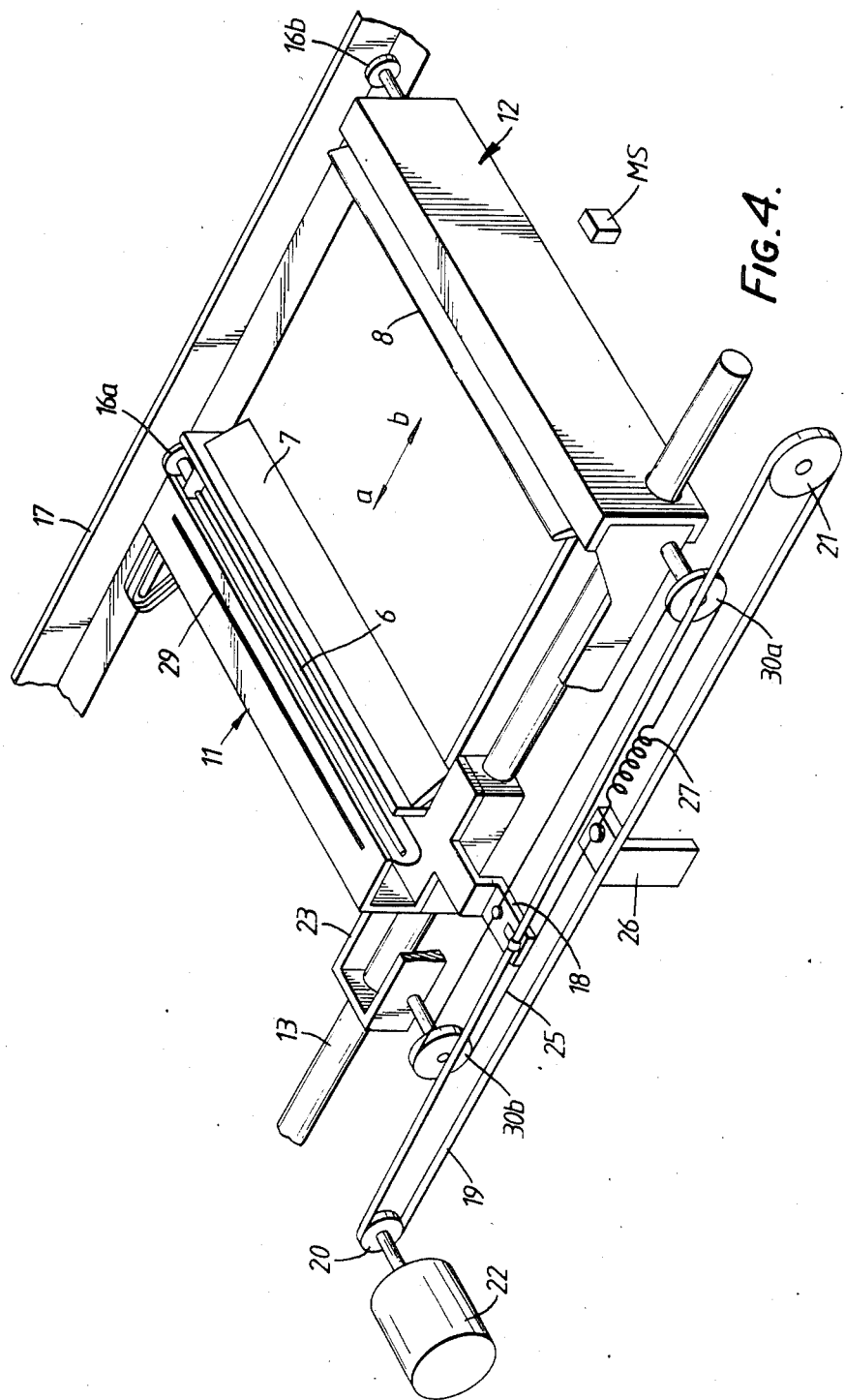
FIG. 4 is a perspective view showing the structure of the optical carriage of the image reading apparatus shown in FIG. 3.

Scanning section 4 has a construction as shown in FIG. 3. Original document G on glass plate 2a is illuminated by light from a lamp 6 and the image of original document G is read by light reflected from original document G being transmitted via first to third mirrors 7, 8 and 9 and a lens 14 to a photosensitive element in the form of CCD 10. Lamp 6 and first mirror 7 are mounted on a first carriage 11, while second and third mirrors 8 and 9 are mounted on a second carriage 12. On the left-hand side, as seen in the drawing, of a frame 1a provided in main body 1, there is a microswitch MS which is switched on when second carriage 12 comes to the leftmost position as seen in the drawing. As shown in FIG. 4, first and second carriages 11 and 12 are each slidably supported by a guide rail 13 at one side thereof, while their other side is supported via rollers 16a and 16b on a guide board 17. The one side of first carriage 11 is connected via a connection piece 16 to a drive belt 19 which is passed around and between a drive roller 20 and an idle roller 21. Drive roller 20 is rotatably driven by a drive motor 22. A frame 23 is formed integrally with the one side of second carriage 12. A pair of pulleys 30a and 30b are provided separated from one another on frame 23, and a wire 26 is passed around and between pulleys 30a and 30b. One end of wire 26 is fixed to a fixed element 26 and its other end is fixed via a spring 27 to fixed element 26. An intermediate portion of wire 25 is connected to connection piece 18 provided on first carriage 11.

A scale 29 constituting a second indicator is provided on an upper surface portion of first carriage 11. This scale 29 is provided in a manner such that it is visible from the exterior of main body 1 via glass plate 2a of original document table 2.

Drive motor 22 is caused to rotate forwards and drive belt 19 is caused to travel by the action of pressing a copy start switch 32 in a control section 31 that will be described later. As a result of travel of drive belt 19, first and second carriages 11 and 12 are driven, via connection piece 18, wire 25 and pulleys 30a and 30b, reciprocally along guide rail 13 and guide board 17 and scan an original document G. Since pulleys 30a and 30b act as running blocks at this time, second carriage 12 moves in the same direction as first carriage 11 but at half the speed, and so the length of the optical path from original document G to CCD 10 is kept constant.

As shown in FIG. 2, printing section 5 possesses a platen 37, and a thermal head 38 is arranged so that it can be brought into contact with or separated from this platen 37. Paper P and an ink ribbon 45 are interposed between platen 37 and thermal head 38. Thermal head 38 emits heat in accordance with image information read by CCD 10 in scanning section 4 and printing is effected by ink of ink ribbon 45 being transferred onto paper P.

Figure 5:
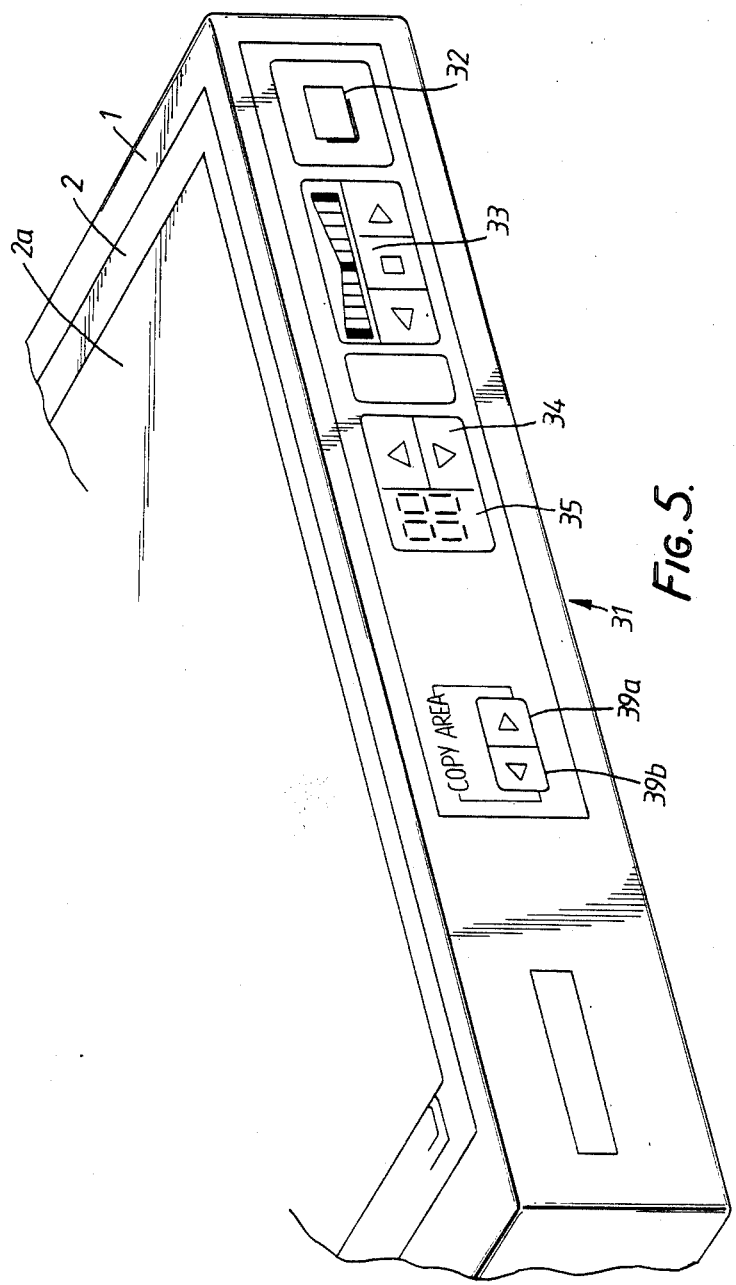
FIG. 5 is a perspective view showing the control section of the scanning printer of FIG. 1.

Control section 31 is provided on a front surface portion of main body 1, as shown in FIG. 5. At the righthand end as seen in the drawing, there is provided copy start switch 32, by the side of which there are successively disposed a copy density adjustment key 33, a number of copies specification key 34, a number of copies display section 35 and a pair of copy area designation switches 39a and 39b.

FIG. 6 shows a movement control circuit for moving first and second carriages 11 and 12 to a scanning start position in response to depression of copy area designation switches 39a and 39b. Copy area designation switch 39a serves for causing first and second carriages 11 and 12 to move in direction a in FIG. 3 and copy area designation switch 39b for causing them to move in direction b in FIG. 3. Switches 39a and 39b each have an output line connected to a central processing unit (CPU) 43 so as to permit supply of movement signals that are generated while they are depressed. Copy start switch 32 and microswitch MS provided at the scanning end position are each connected to CPU 43. CPU 43 has output lines connected to a pulse motor drive circuit 44 whose output connects to drive motor 22, which is operatively coupled to first and second carriages 11 and 12. While designation switch 39a or 39b is depressed, a set number of pulses are supplied via CPU and from pulse motor drive circuit 44 to drive motor 22 and cause it to rotate. Motor 22 is driven forwards so as to move first and second carriages 11 and 12 in the direction a indicated in FIG. 3 when designation switch 39a is pressed and is rotated in reverse so as to move them in the direction b indicated in FIG. 3 when designation switch 39b is pressed.

Figure 8:
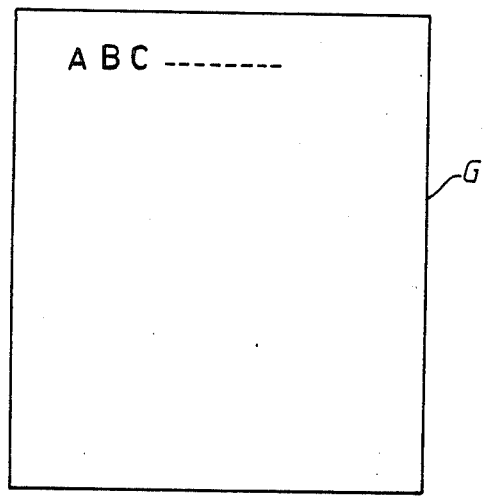
FIG. 8 is a plane view of an original document that is copied.
Figure 9:
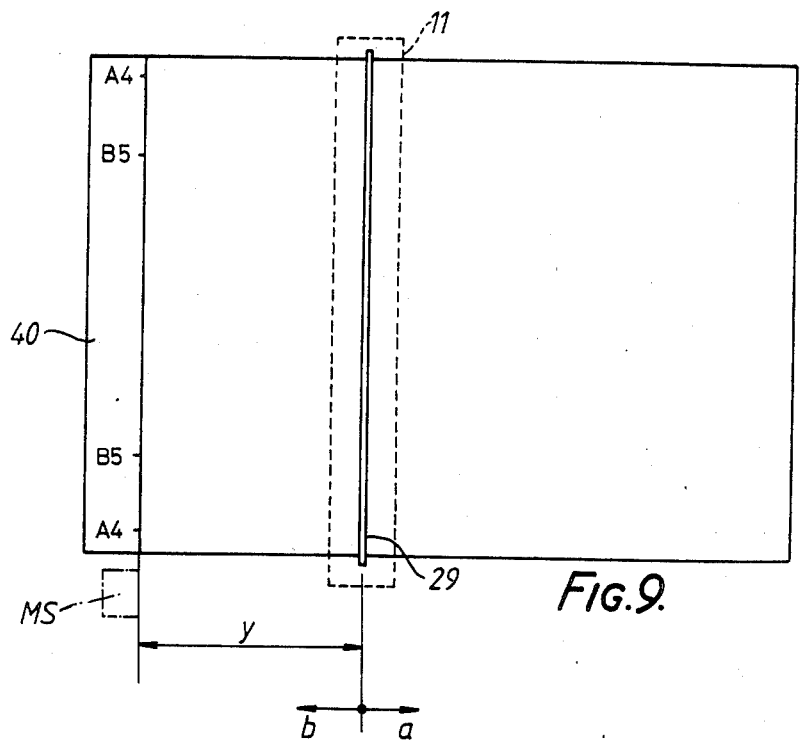
FIG. 9 is a plane view of the original document table of the image reading apparatus of present invention.
Figure 10:
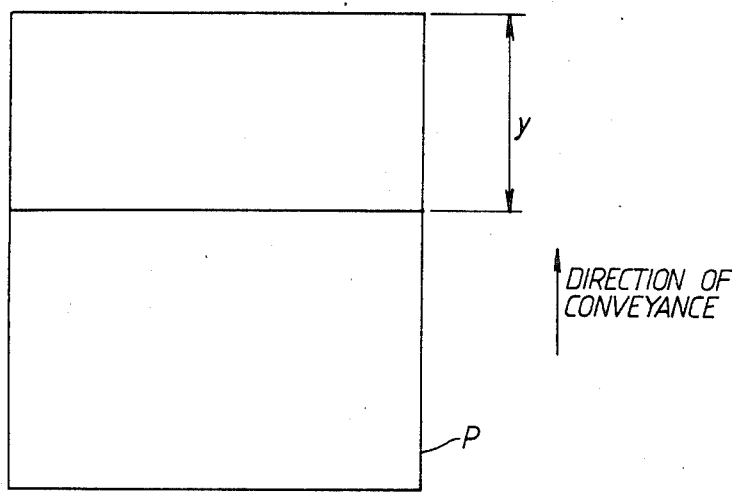
FIG. 10 is a plane view of the copy area of an original document.
Figure 11:
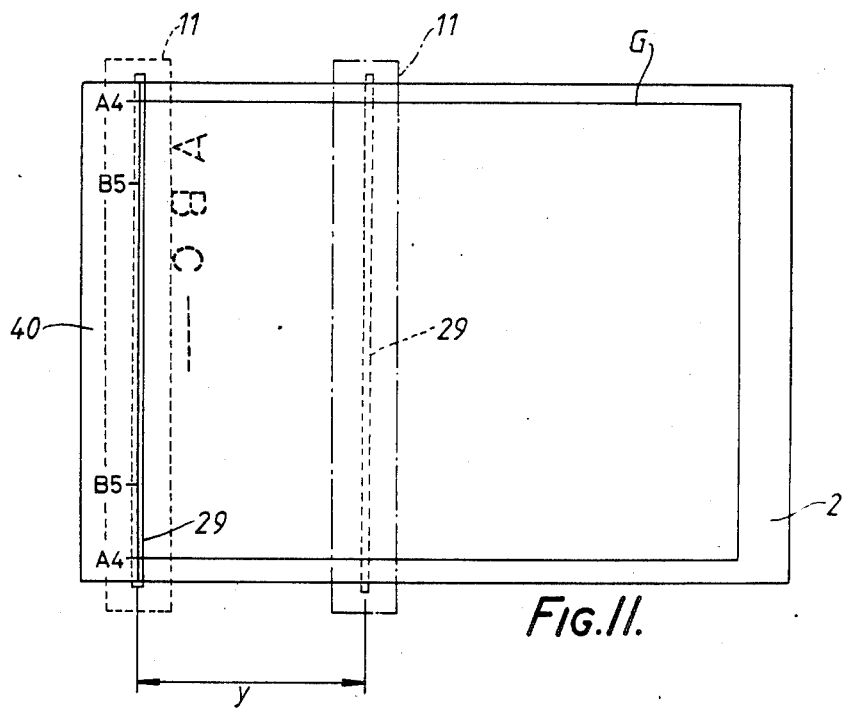
FIG. 11 is a plane view of the original document table illustrating setting of an original document and specification of a copy area.
Figure 12:
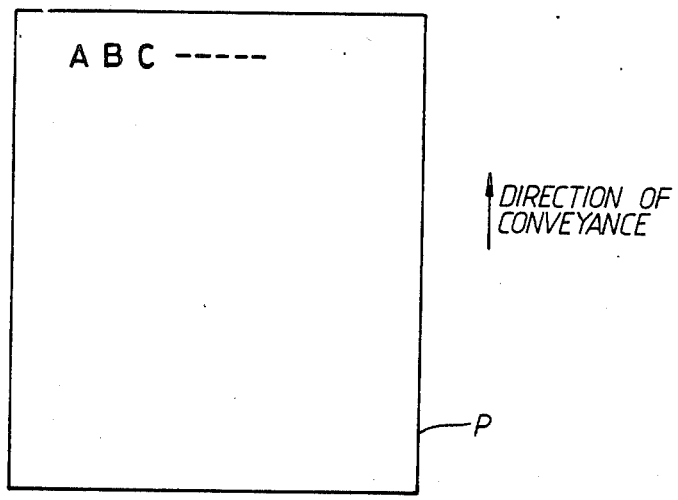
FIG. 12 is a plane view of paper onto which a copy has been made.
Figure 13:
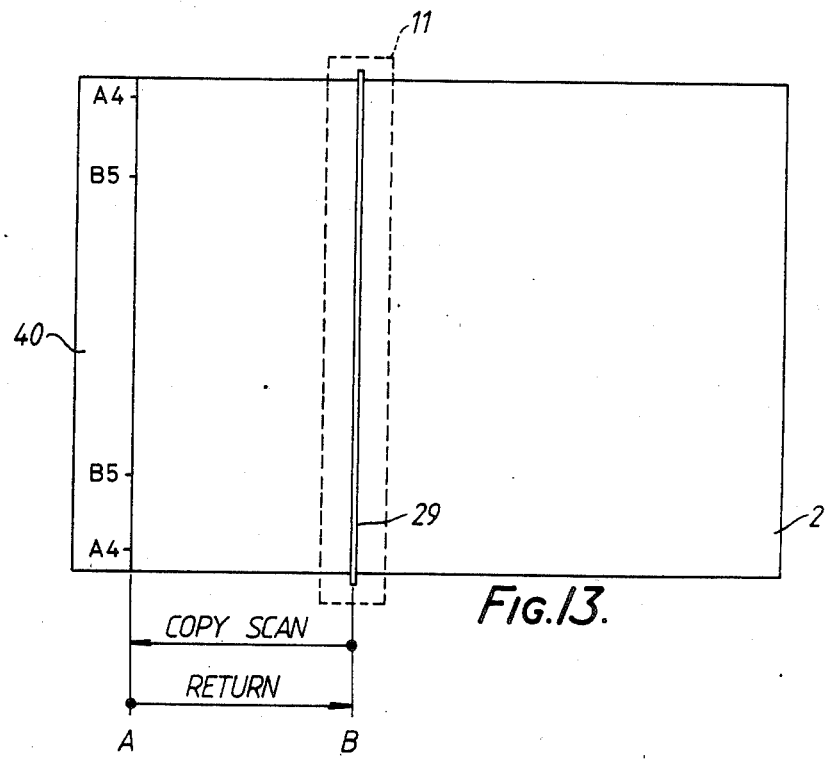
FIG. 13 is a plane view of the original document table showing how the optical carriage moves.

Next, the operation of the present invention will be described. If, for example, it is required to copy a portion (the range y shown in FIG. 10) of an original document G such as shown in FIG. 8, first, original document G is set on glass plate 2a against original document scale 40 as shown in FIG. 11. When, now, copy area designation switch 39a is pressed, the movement signals shown in FIG. 7A are output from switch 39a and input into pulse motor drive circuit 44 via CPU 43. As a result, pulse motor drive circuit 44 outputs forward drive signals as shown in FIG. 7C, these drive signals are supplied to drive motor 22, drive motor 22 rotates forwards a number of turns corresponding to the number of drive signal pulses with which it is supplied from pulse motor drive circuit 44 and as a result first and second carriage 11 and 12 are moved in direction a from the position indicated by the dashed lines in FIG. 3 to the scanning start position indicated by full lines. In other words, they are located at point B in FIG. 13 (a position that is a distance y from original document scale 40). If copy area designation switch 39a is pressed for too long, resulting in overtravel in direction a beyond the location of point B in FIG. 13, copy area designation switch 39b is pressed. This results in output of the movement signals shown in FIG. 7B from switch 39b and these movement signals are input into pulse motor drive circuit 44 via CPU 43. As a result, reverse drive signals as shown in FIG. 7C are output from pulse motor drive circuit 44 and supplied to drive motor 22, and drive motor 22 is rotated in reverse a number of turns corresponding to the number of drive signal pulses with which it is supplied from pulse motor drive circuit 44, so causing first and second carriages 11 and 12 to move in the direction b shown in FIG. 3. In this manner, a return to the location of point B in FIG. 13 can be effected. The operator presses copy area designation switch 39a or 39b while observing scale 29 provided on first carriage 11 via glass plate 2a.

Next, on depression of copy start switch 32, lamp 6 lights up and the start signal shown in FIG. 7E is supplied to drive motor 22 via CPU 43 and pulse motor drive circuit 44. As a result, first and second carriages 11 and 12 are moved in direction b over a distance y from the location of point B in FIG. 13 and the range y of original document G is optically scanned. As a result of this optical scanning, image information is read by light reflected from original document G being focussed at CCD 10 via mirrors 7, 8 and 9 and lens 14. Heating of thermal printing head 38 in printing section 6 is effected on the basis of the image information that has been read, ink of ink ribbon 45 is transferred onto paper P and an image of original document G is copied on paper P. On arrival of second carriage 12 at the scanning end position, microswitch MS is actuated and the stop signal shown in FIG. 7F is produced and supplied via CPU 43 and pulse motor drive circuit 44 to drive motor 22. This terminates optical scanning by first and second carriages 11 and 12.

Figure 14:
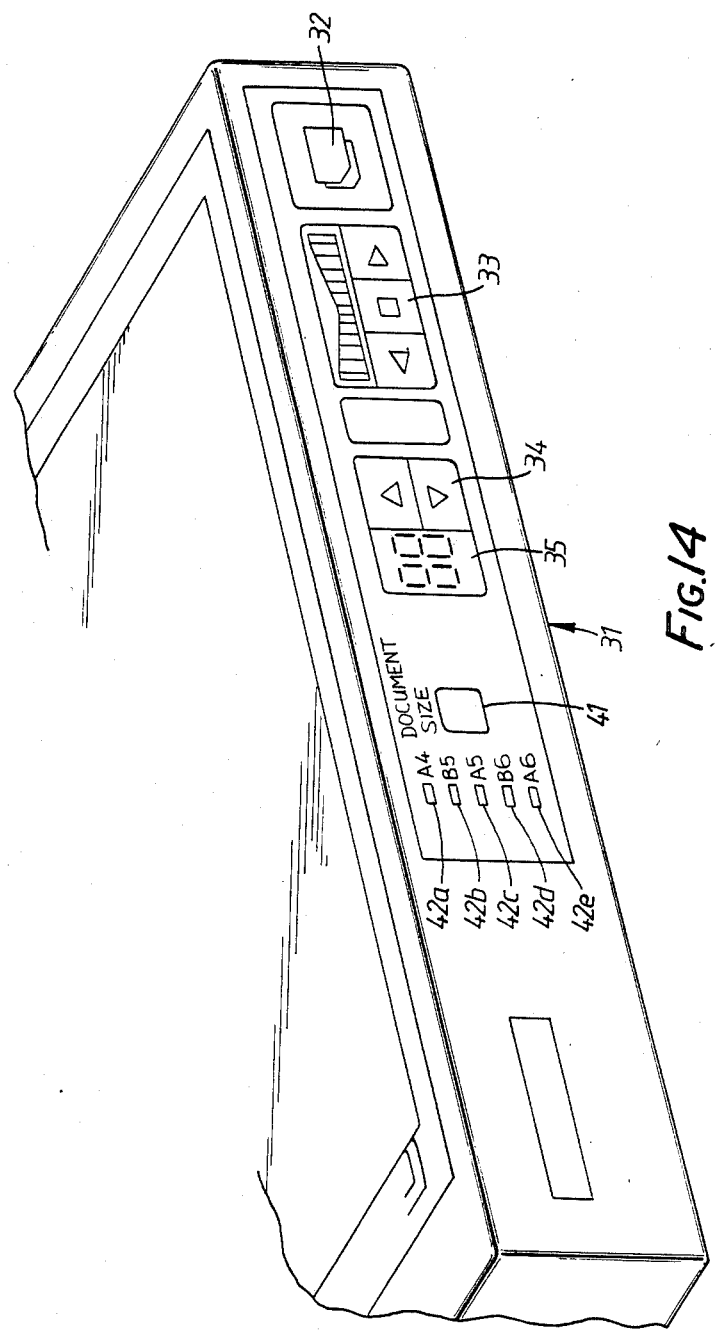

Next, a description of a second embodiment of the present invention will be given with reference to FIG. 14 through FIG. 21. The control section 31 shown in FIG. 14 is provided with an original document size selection switch 41 instead of the copy area designation switches 39a and 39b of FIG. 5 that were described in the first embodiment above. A plurality of display lamps 42a, 42b, 42c, 42d and 42e that display the sizes of different types of original document are disposed alongside original document size selection switch 41. Display lamp 42a represents an original document size A4, 42b represents size B5, 42c represents size A5, 42d represents size B6 and 42e represents size A6. These display lamps 42a, 42b, 42c, 42d and 42e light up cyclically each time original document size selection switch 41 is pressed. Normally, display lamp 42a for A4, the maximum size, is lit. The arrangement is such that after elapse of a set time following completion of copying with a lamp other than A4 size display lamp 42a lit, there is an automatic changeover to lighting of A4 size display lamp 42a.

Figure 21:
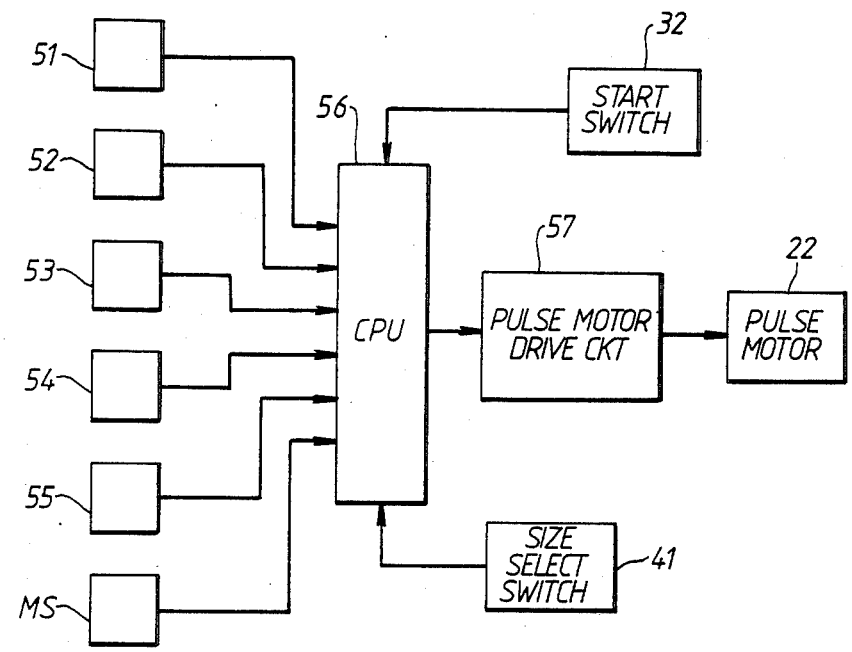

As shown in FIG. 16, microswitches 51, 52, 53, 54 and 55 are disposed in order, going from right to left as seen in the drawing, along the path of movement of first carriage 11. Microswitch 51 is located in a position corresponding to an A4 original document size, microswitch 52 in a position corresponding to B5, microswitch 53 in a position corresponding to A5, microswitch 54 in a position corresponding to B6 and microswitch 55 in a position corresponding A6. These microswitches 51-55 are pressed and actuated by first carriage 11. A microswitch MS is provided on the left-hand side, as seen in the drawing, of frame 1a provided in main body 1, like the microswitch MS of the first embodiment shown in FIG. 3 and FIG. 4. This microswitch MS is switched on when second carriage 12 comes to the leftmost position as seen in the drawing. Microswitches 51-55 and microswitch MS are each connected to a pulse motor drive circuit 57 via a CPU 56, as shown in FIG. 21. Pulse motor 22 is rotated by a set number of pulses from pulse motor drive circuit 57 and drives first and second carriages 11 and 12.

First and second carriages 11 and 12 of optical scanning unit 9 scan an original document G on glass plate 2a upon depression of copy start switch 32, and on completion of scanning, they stop in the position in which they are on this completion.

Original document sizes are specified by original document size selection switch 41, and if first and second carriages 11 and 12 are located at original document scale 40 when original document G has been set on the original document table 2, they start scanning from original document scale 40 in response to actuation of copy start switch 32. If they are not located at original document scale 40, first and second carriages 11 and 12 are moved by the action of pulse motor 22 to original document scale 40 or to the righthand edge of the original document G to be copied, whichever is the nearer, and they start scanning from this position.

Figure 22:
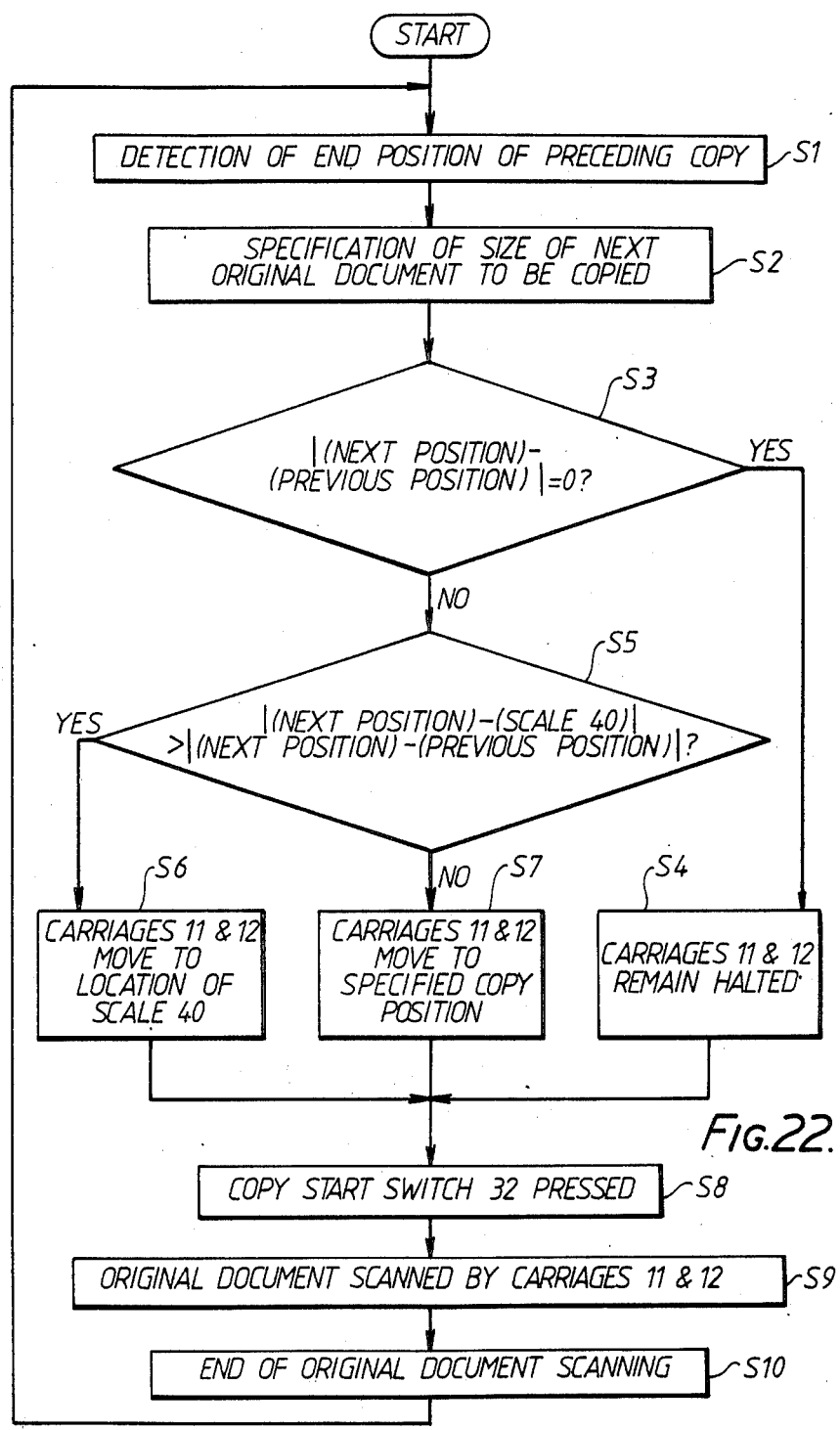
FIG. 22 is a block diagram in illustration of electrical operation.

In more detail, as shown in the flowchart of FIG. 22, one of the microswitches 51-55 and MS detects the position at which carriages 11 and 12 have halted on completion of a print operation by the preceding operator (S1) and this halt position is stored in CPU 56. The operator who is next to effect a print operation presses original document size selection switch 41 to specify the required original document size (S2). The selection signal from selection switch 2e is input to CPU 56 and CPU 56 compares (S3) the position corresponding to the original document size specified in step S2 and the halt position detected in step S1. If they are found to be equal in this comparison, i.e., if the result of subtraction between the next position and the previous position is "0", carriages 41a and 41b do not move but remain halted (S4), and this position at which they remain halted constitutes the scanning start position when the next print operation is effected. If the result of the subtraction in step 3 is not "0", the following comparison is made. The distance from the next position to the edge of original document table 3, i.e., to original document scale 40, is compared with the distance that is the difference between the position corresponding to the original document size specified in step S2 and the halt position detected in step S1 to see if it is larger (S5). If the result of the comparison in step S5 shows that it is larger, i.e., if it is found that original document scale 40 is nearer than the next position, carriages 11 and 12 are moved by rotation of pulse motor 22 to the position corresponding to original document scale 40 (S6), and this position constitutes the scanning start position when the next printing operation is effected. If the result of the comparison in step S5 shows it to be smaller, i.e., the next position is found to be nearer than original document scale 40, carriages 11 and 12 are moved by rotation of pulse motor 22 to the next position (S7) and this position constitutes the scanning start position when the next printing operation is effected.

Then, the scanning start position of carriages 11 and 12 having been set, copy start switch 32 is pressed by the operator (S8). Receiving input of a start signal, CPU 56 supplies pulse motor 22 with drive signals to a set number of pulses via a pulse motor drive circuit 57. Hereupon, pulse motor 22 rotates, carriages 11 and 12 are moved a distance corresponding to the original document size, the original document is illuminated by lamp 11 and a scanning operation is carried out (S9). At the scanning end position, one of switched 51-55 and MS is pressed by carriage 41a or 41b and an end position signal is input to and stored by CPU 56 (S10). There is subsequently a return to step S1 on execution of a printing operation by the next operator.

For example, to copy a size A4 original document G1 as shown in FIG. 16 (supposing, for example, that the size of the previously copied original document G2 was B5), original document size selection switch 41 of control section 31 is pressed to cause size A4 lamp 42a to light up. As a result, drive motor 22 is actuated via CPU 56 and pulse motor drive circuit 57 and first and second carriages 11 and 12 are moved in accordance with the size of original document G1 from point A to point B. That is, the flow of steps S1→S2→S3→S5→S7 in the flow chart of FIG. 22 is performed. When subsequently, copy start switch 32 is pressed, lamp 6 on first carriage 11 is lit and first and second carriages 11 and 12 are moved from point B towards point C, so effecting scanning of original document G1. The image of original document G1 is read by light reflected from the document being focussed at CCD 10 via first-third mirrors 7, 8 and 9 and lens 14. Then, thermal head 38 is caused to emit heat on the basis of the image information that has been read and ink of ink ribbon 45 is transferred onto paper P and an image is formed in the manner shown in FIG. 17.

Figure 18:
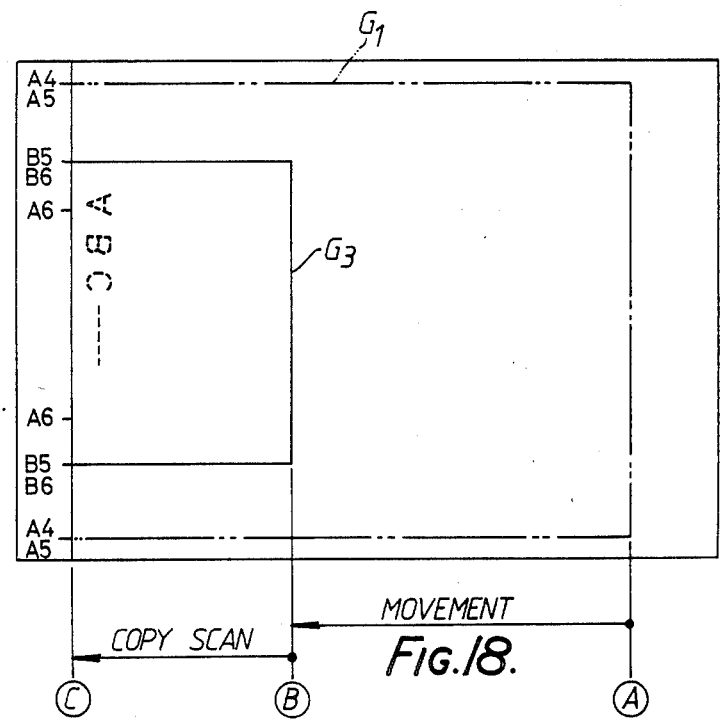
Figure 19:
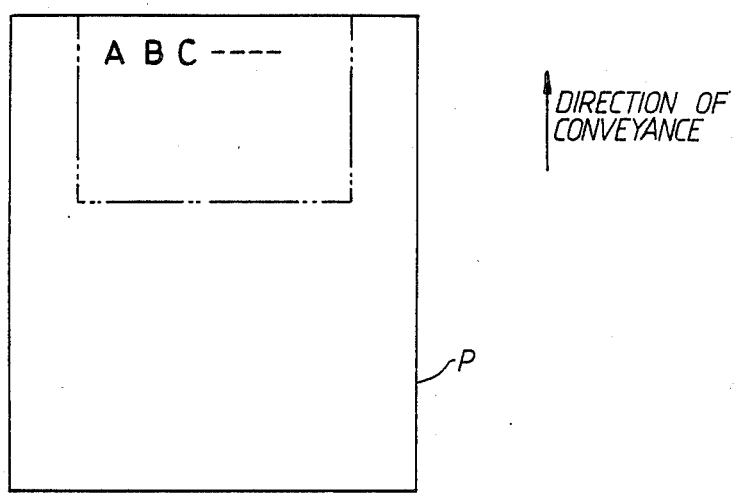

Alternatively, to copy a size B6 original document G3 that has been set lengthways as shown in FIG. 18 (the size of the previously copied original document G1 this time being A4 and first and second carriages 11 and 12 being halted at Point A), original document size selection switch 41 of control section 31 is pressed to cause size B6 lamp 42d to light up. As a result, drive motor 22 is actuated via CPU 56 and pulse motor drive circuit 57 and first and second carriages 11 and 12 are moved in accordance with the size of original document G3 from point A to point B. That is, the flow of steps S1→S2→S3→S5→S7 in the flowchart of FIG. 22 is performed. When subsequently, copy start switch 32 is pressed, lamp 6 on first carriage 11 is lit and first and second carriages 11 and 12 are moved from point B towards point C, so effecting scanning of original document G3. This scanning results in reading of the image in the same way as described above and froming of the image on paper P as shown in FIG. 19.

Figure 17:
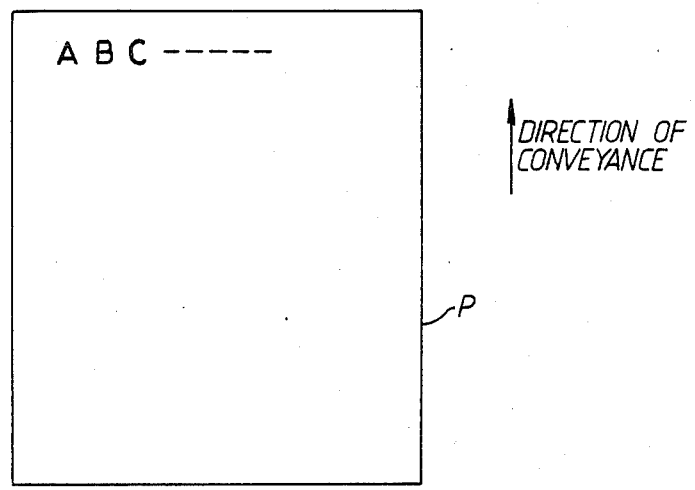
Figure 20:
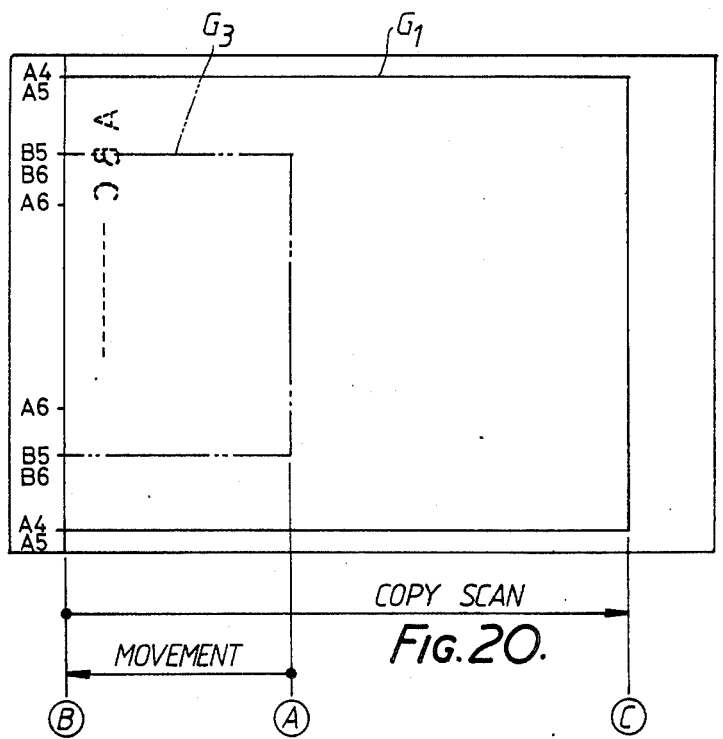

Alternatively, to copy a size A4 original document G1 that has been set lengthways as shown in FIG. 20 (the size of the previously copied original document G3 this time being B6 and first and second carriages 11 and 12 being halted at point A), original document size selection switch 41 of control section 31 is pressed to cause size A4 lamp 42a to light up. As a result, drive motor 22 is actuated via CPU 56 and pulse motor drive circuit 57 and first and second carriages 11 and 12 are moved in accordance with the size of original document G1 from point A to point B. That is, the flow of steps S1→S2→S3→S5→S6 in the flowchart of FIG. 22 is performed. When subsequently, copy start switch 32 is pressed, lamp 6 on first carriage 11 is lit and first and second carriages 11 and 12 are moved from point B towards point C, so effecting scanning of original document G3. This scanning results in reading of the image in the same way as described above and forming of the image on paper P as shown in FIG. 17.

What is claimed as new and desired to be secured by Letters Patent of the United States is:

1. Image reading apparatus for moving an optical carriage while radiating light from a light source provided on said carriage towards an original document set on an original document table and reading the image of said document by causing light reflected from said document to be received by a photosensitive element comprising:
   a specifying means for specifying a scanning start position and the range of illumination by said light source resulting from movement of said optical carriage with respect to said original document set on said original document table;
   means for moving said optical carriage to said scanning start position; and
   a movement control means for controlling movement of said optical carriage from said scanning start position over a distance such that light from said light source is radiated over said specified illumination range in accordance with the specification of said specifying means.

2. Image reading apparatus as in claim 1, wherein said specifying means comprises:
   a first indicator provided on said original document table in a manner such that one edge of an original document may be aligned therewith;
   a second indicator visibly provided on said optical carriage so that the scanning start position of said optical carriage may be indicated;
   a designating means for designating movement of said optical carriage with said second indicator provided thereon to a movement start position; and
   said moving means moving said optical carriage to said start position in accordance with a designation by said designating means.

3. Image reading apparatus as in claim 2, wherein said designating means comprises:
   a first switch means for designating movement of said optical carriage in a first direction; and
   a second switch means for designating movement of said optical carriage in a second direction.

4. Image reading apparatus as in claim 3, wherein said moving means comprises:
   a pulse motor drive circuit to which first or second movement signals produced as a result of operation of said first or second switch means are supplied via a central processing unit (CPU); and
   a pulse motor which is driven in accordance with pulse signals to a number of pulses supplied from said pulse motor drive circuit and is operatively coupled with said optical carriage.

5. Image reading apparatus as in claim 1, wherein said specifying means comprises:
   a first indicator provided on said original document table in a manner such that one edge of an original document may be aligned therewith;
   a selection means for selecting an original document size so as to specify the other edge of said original document; and
   said moving means on the basis of the selection by said selection means, takes the position of said first indicator or a position corresponding to the other edge of said original document as a scanning start position and moves said optical carriage to said scanning start position.

* * * * *